UNITED STATES PATENT OFFICE.

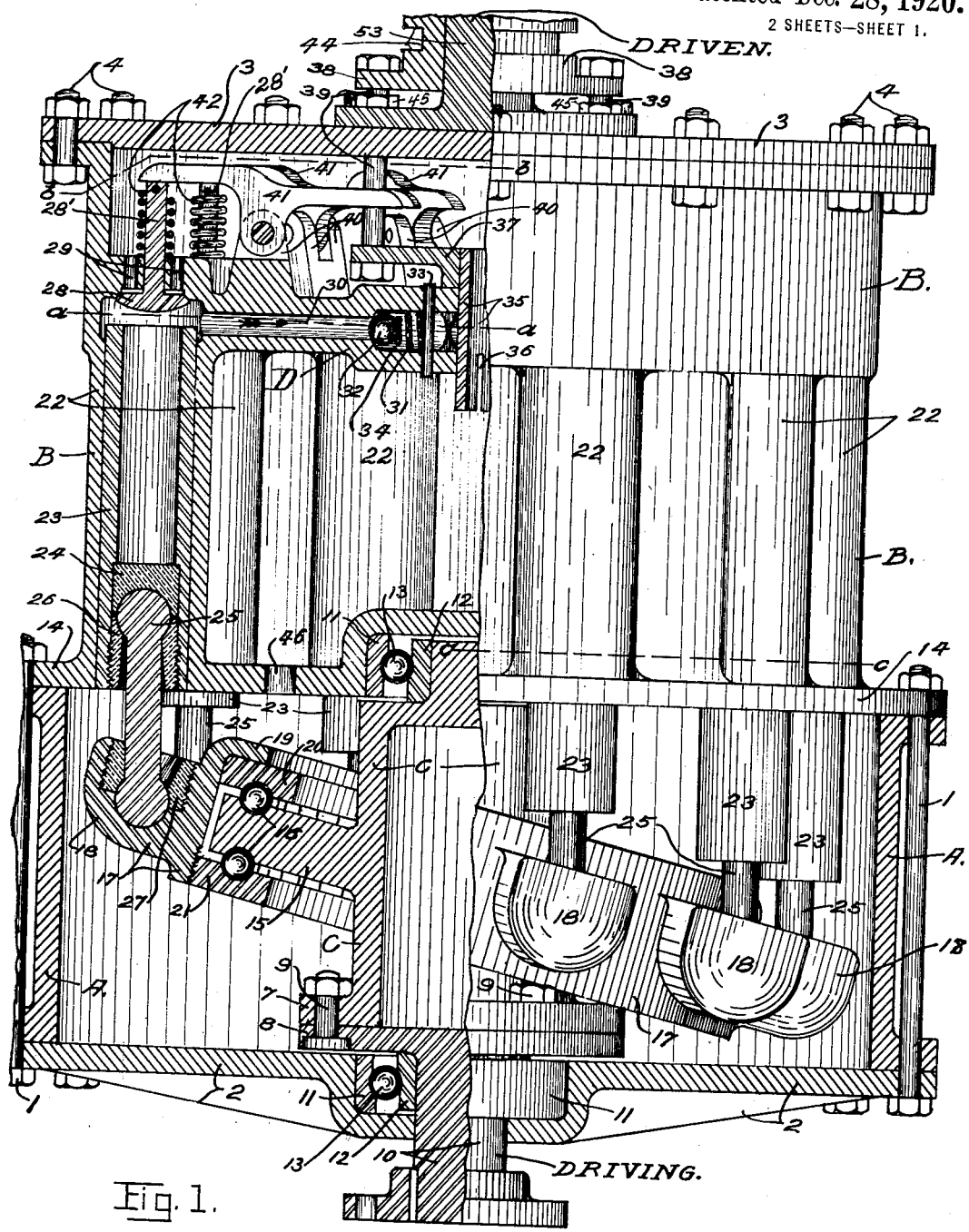

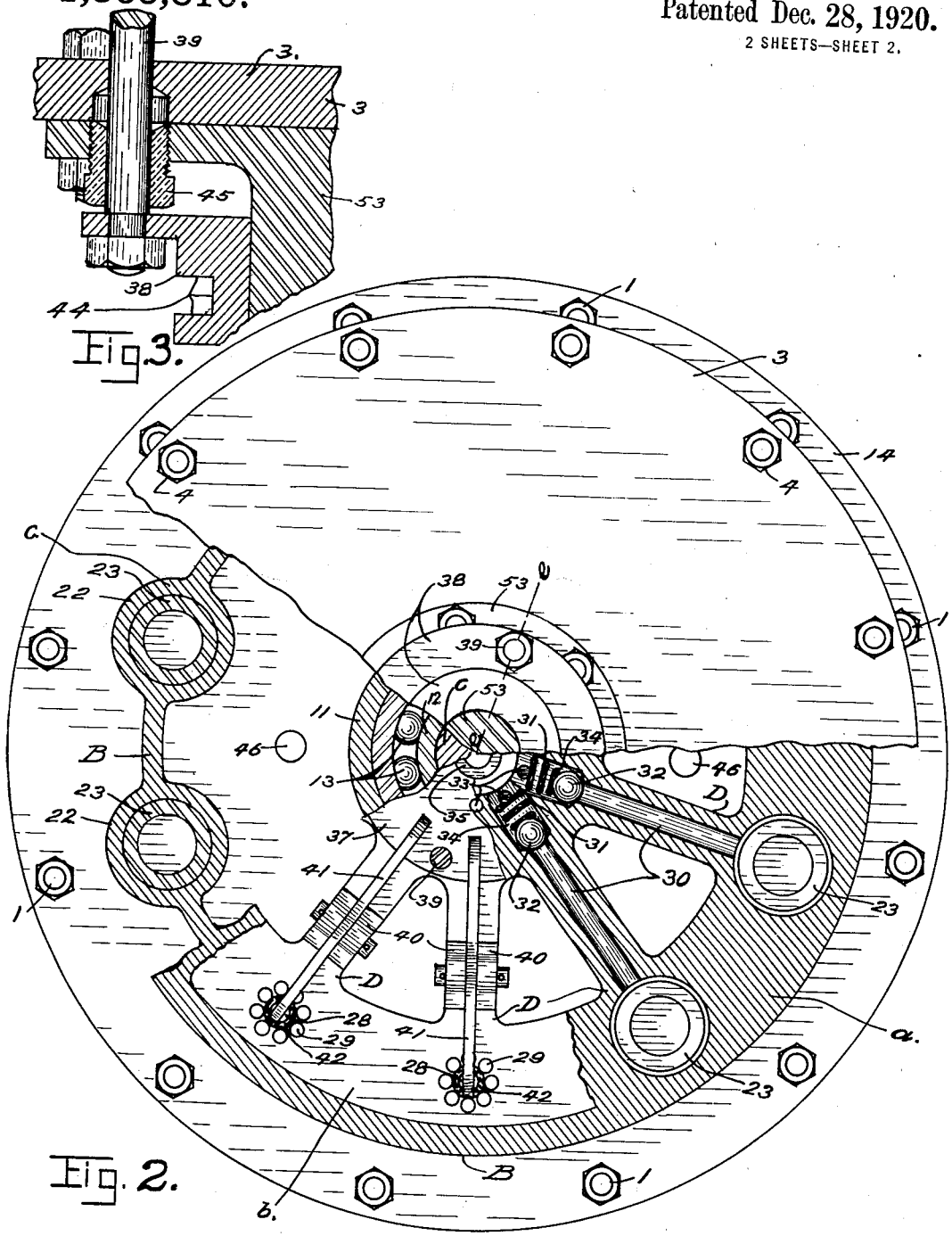

PETER R. PETERSON, OF SALT LAKE CITY, UTAH, ASSIGNOR TO PETERSON-HARNDON FLUID CLUTCH COMPANY, OF SALT LAKE CITY, UTAH, A CORPORATION OF UTAH.

POWER-TRANSMISSION MECHANISM.

1,363,810.  Specification of Letters Patent.  Patented Dec. 28, 1920.

Application filed July 29, 1918. Serial No. 247,340.

*To all whom it may concern:*

Be it known that I, PETER R. PETERSON, a citizen of the United States, residing at Salt Lake City, in the county of Salt Lake and State of Utah, have invented certain new and useful Improvements in Power-Transmission Mechanisms, of which the following is a specification.

My invention relates to power transmission and has for its object to provide a flexible power transmission means, comprising a driving member, a driven member and an interposed fluid medium for transmitting the power from the driving to the driven member and wherein the relation of said members may be varied to regulate the power transmitted.

These objects I accomplish with the mechanism illustrated in the accompanying drawings in which similar letters and numerals of reference indicate like parts throughout the several figures and as described in the specification forming a part of this application and pointed out in the appended claim.

In the drawings in which I have shown a substantial embodiment of my invention, Figure 1 is an elevation of the machine, parts being shown in section. Fig. 2 is an end elevation of the driven end with parts cut away showing sections on lines *a—a*, *b—b*, and *c—c* of Fig. 1. Fig. 3 is a longitudinal section on line *e—e* of Fig. 2 to show the packing nuts 45 on the bolts 39.

In the drawings illustrating the present invention the cylindrical casings A and B are bolted together by bolts 1 passed through flanges on said casings and through the head 2 of the casing A. The head of the casing B is shown at 3 and is bolted on the said casing B by the bolts 4. Within the casing A is operated the rotor C, the interior of which is removed to lighten the weight. The said rotor C is secured at one end by bolting the flange 7 of said rotor C to the flange 8 of the driving member 10, by the bolts 9. As a bearing for said member 10 in said head 2 the roller bearing sleeves 11 and 12 with the balls 13 are provided. Similar sleeves and balls are provided in a recess formed in the partition head 14 of the casing B as a bearing for the other end of said rotor C. The said rotor C consists of a cylindrical portion and an annular integral flange 15 formed therearound and positioned at an incline from the plane of said cylindrical portion. The said inclined flange 15 has annular grooves cut in its side faces to form ball races for the balls 16. An outer casing is provided for said balls 16 consisting of an internally threaded annular member 17 with outward extending semi-spherical lugs 18 thereon and with an inturned flange 19. An annular ball ring 20 is carried in said member 17 with a groove therein to form a portion of the race for the said balls 16. An opposed ball ring 21 is externally threaded and is screwed into the said member 17 by which the balls 16 are held in place and any adjustment in said races may be made when desired. The said casing B is cylindrical in form and has a wheel shaped partition D therein which is spaced from each end. In the wall of the said casing B between the said partition D and the said head 14 a plurality of cylinders shown at 22 are bored cutting into the said partition D and in which cylinders 22 the cup shaped pistons 23 are operated, each of said pistons 23 having a socket member 24 carried therein in which one end of the dumb-bell connecting member 25 is carried. A sleeve bearing 26 is screwed into the end of each of said pistons 23 to hold the spherical end of the said dumb-bell connection 25 in place; forming what is called a ball and socket joint between said pistons and the respective members 25. The other end of each of said dumb-bell connections is operatively connected with the said annular member 17, by having a bearing member 27 screwed into the semi-spherically shaped lug portions 18 of the member 17. The end of each of said cylinders 22 is bored to form a seat for the valve 28 which is operable in the end of the cylinder, and a plurality of smaller openings 29 are bored in the partition D through which the fluid flows into said cylinders 22 when said valves 28 are unseated. The portion of said partition D uncut by the holes 29 is bored to form bearings for the stems of said valves 28. Radially disposed fluid conduits 30 are bored in the spokes of said partition member D, and a portion of each of said conduits is bored larger as at 34 to form a seat for the ball valves 32, each of which is held in place by the spiral spring 31, with a pin 33 to hold the spring in place. The central portion of said partition member D is bored out to form a valve chamber for the main fluid valve 35. The said valve 35 is cylindrical in form with longitudinally disposed slots 36 cut in its wall adapted to be brought in juxtaposition with the said conduits 30 and 34 to allow fluid to pass. The said valve 35 is secured to the disk 37, and it in turn is fastened to the collar 38 by the bolts 39. Portions of said partition member D are extended to form bearing jaws 40 between which jaws the lever members 41 are pivoted. One end of each of said levers 41 is to be moved by said disk 37 while the other end of each lever is to move the valves 28 by bearing against the stems 28'. Spiral springs 42 are carried on the said stems 28' to hold the said valves 28 normally closed. The said collar 38 is slidably carried on the driven member 53, which member 53 is secured to the head 3 of said casing B. The interior of the said casing A surrounding the rotor C, and of the said casing B is to be filled with a fluid preferably oil, which oil will flow freely from the interior of the said casing B to the interior of the casing A through the openings 46, and the fluid from the interior of the casings A and B is drawn to the interior of the cylinders 22, through the valves 28 and forced out through the valve 35 as the elements are operated. For a much restricted flow, which will be the flow used when almost all of the power is to be transmitted, I use the valve 35; and in order to use said valve 35 without opening the valves 28 this movement of the said collar 38 and its connected disk 37 will move the said valve 35 until the greater portion of the said slots 36 are opened and the fluid will flow through the conduits 30 before the said levers 41 are moved far enough on their fulcrums to cause the valves 28 to be unseated, and when all of the valves 28 are unseated by the collar 38 being moved away from the said casing A, by a lever which is not shown engaging in the channel 44 cut in said collar, the cup shaped pistons 23 will be operated freely in their respective cylinders 22 and the fluid will offer no resistance to the movement of said rotor, and no power will be transmitted to the driven member, and the casings A and B will not be rotated. When the collar is brought toward the casing A by a reverse movement of said unshown lever, the valves 28 will be seated by the release of the levers 41 and the action of the springs 42 on the downward stroke of the pistons 23 and opened by the upward stroke, and the slots 36 will be partially closed and the flow of the fluid from the chambers through the conduits 30 and 34 and slots 36 will be restricted and the movements of the cup-shaped pistons 23 will be retarded and in turn the rotation of the rotor C; this will cause the driving member 10 to engage the driven member 53 and to that extent power will be transmitted; and if the machine is in use on an automobile, the high speed of the engine will be given the automobile. As this resistance to the flow of the fluid is removed by the further opening of the valves 35 and 28 less power will be transmitted.

The operation of my invention when used as the clutch on an automobile with the engine running and the automobile standing, is as follows:—

With the clutch lever which is not shown, engaging in the channel 44 of the collar 38, the collar will have been moved away from the said casing B as far as the bolts 39 will allow, the rotor C will be moving freely in the casing A, as the valves 28, and 35 are all open and there is no resistance to the free movement of said pistons 23. By moving the collar 38 toward the casing B all of the valves 28 will first be closed by the springs 42, and the movement of the oil in the cylinders 22, when the piston 23 in each respective cylinder is operated, will be through the openings 29 and around the valve 28, as said pistons move away from the valve 28 and outward through the conduits 30 and slots 36 in the valve 35 when the pistons move in the opposite direction. This will be a restricted flow depending on the portion of said slots 36 which is open to the conduit 34, and with said slots almost open the retarding of the rotor will be slight and the automobile will move slowly. As said movement of the collar 38 is continued gradually toward the casing B, more of said slots 36 will be closed and more resistance to the flow of oil will be offered through the conduit 30, and the rotation of the rotor will be the same while the rotation of the casings will be faster and the speed of the automobile increased. This movement of the collar and its connections to the valve 35 if continued will close all of said slots 36 and no oil will flow into or out of said cylinders 22 and the rotor C will engage the casings and full power of the driving member 10 will be imparted to the driven member 53. This is illustrated when the elements are in the position shown in Fig. 1. Desiring to slow down the automobile with the engine running at high speed the operator will move the collar away from the casing B and open the slots 36 to allow oil to flow through the conduits 30 and 34, and in proportion as the flow of oil is increased the speed of the automobile will decrease.

I thus provide a power transmitting mechanism consisting of a novel rotor, and pistons connected therewith which are controlled by a flow of fluid through the chambers in which the pistons are operated, and in which the flow of the fluid is directed by new and novel valves.

Having thus described my invention I desire to secure by Letters Patent and claim:—

A power transmission machine consisting of a driving member; a driven member; coacting casings bolted together and to said driven member; a rotor operable in one of said casings; an inclined flange integral with said rotor; an annular casing in which said inclined flange is operated; bearings between said inclined flange and said last mentioned casing; a plurality of cylinders in the wall of one of said casings; pistons operable in said cylinders; ball and socket connections between said pistons and said annular casing; a fluid in said coacting casings; a wheel shaped partition in one of said casings having ports 29 therein connecting the interior of one end portion of said casing with the interior of its other end portion and lateral ports 30 and 34 in the spokes of said partition connecting the interior of said cylinders with the interior of casing B; and valves operable in said ports to control the flow of fluid through said ports as desired.

In testimony whereof I have affixed my signature.

PETER R. PETERSON.